US008805460B2

(12) United States Patent
Tang

(10) Patent No.: US 8,805,460 B2
(45) Date of Patent: Aug. 12, 2014

(54) SLIDE-TYPE PORTABLE ELECTRONIC DEVICE

(75) Inventor: Zi-Ming Tang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 839 days.

(21) Appl. No.: 12/492,400

(22) Filed: Jun. 26, 2009

(65) Prior Publication Data

US 2010/0160009 A1 Jun. 24, 2010

(30) Foreign Application Priority Data

Dec. 23, 2008 (CN) .......................... 2008 1 0306480

(51) Int. Cl.
*H04M 1/00* (2006.01)

(52) U.S. Cl.
USPC .................................... 455/575.4; 455/575.1

(58) Field of Classification Search
CPC H04M 1/0227; H04M 1/0235; H04M 1/0237
USPC ................. 455/550.1, 575.1, 575.4, 128, 347
See application file for complete search history.

(56) References Cited

U.S. PATENT DOCUMENTS 7,801,580 B2 * 9/2010 Cho et al. ................... 455/575.4
2005/0136998 A1 * 6/2005 Spence et al. .............. 455/575.3
2007/0010284 A1 * 1/2007 Park ............................ 455/550.1
2007/0060220 A1 * 3/2007 Hsu ............................. 455/575.4
2010/0027201 A1 * 2/2010 Wang et al. .............. 361/679.01

FOREIGN PATENT DOCUMENTS

CN 2927532 Y 7/2007
TW M302207 12/2006

* cited by examiner

*Primary Examiner* — Andrew Wendell
(74) *Attorney, Agent, or Firm* — Novak Druce Connolly Bove + Quigg LLP

(57) ABSTRACT

A slide-type portable electronic device includes a first body, a second body, two sliding assemblies, and a first elastic assembly. The sliding assemblies connect the first body and the second body. The first elastic assembly includes a first guiding member and a first elastic member connecting with the first guiding member. A first fixing portion is formed on the second body. A connecting pole is formed on the first body. The first elastic member is connected to the first fixing portion, and the first guiding member is rotatably sleeved on the connecting pole.

9 Claims, 6 Drawing Sheets

SLIDE-TYPE PORTABLE ELECTRONIC DEVICE

BACKGROUND

1. Technical Field

The present disclosure relates generally to portable electronic devices and, more particularly, to a slide-type portable electronic device.

2. Description of Related Art

Currently, slide-type portable electronic devices are becoming increasingly popular. A slide-type portable electronic device is generally configured with a first body, a second body and a slide mechanism connecting the second body with the first body. A keypad is configured in the first body, and a display is configured in the second body. The second body slides over the first body via the slide mechanism, thereby opening and closing the portable electronic device.

A typical slide mechanism includes a main plate, a slide plate and two springs. The main plate is fixed to the first body and the slide plate is fixed to the second body of the sliding-type portable electronic device. Opposite ends of each spring are riveted to the main plate and the slide plate respectively. In opening the slide-type portable electronic device, the first body slides relative to the second body driven by an external force, and the springs are deformed, thereby accumulating elastic energy. When the first body reaches a predetermined position of the second body, the springs are at their most deformed position, thereby storing maximum elastic energy. The external force is removed from the first body. The first body automatically slides under an elastic force of the springs, immediately after the first body passes the predetermined position of the second body.

However, in assembly of the slide-type portable electronic device, each spring is generally riveted to the main plate and the slide plate respectively. If the springs are broken, disassembly thereof from the main plate or the slide plate is difficult, and the slide mechanism is rendered inoperable, generating high maintenance costs. In addition, friction force between the main plate and the slide plate is considerable, resulting in inconvenient operation when sliding the slide plate relative to the main plate.

Therefore, a slide-type electronic device which overcomes the described limitations is desired.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
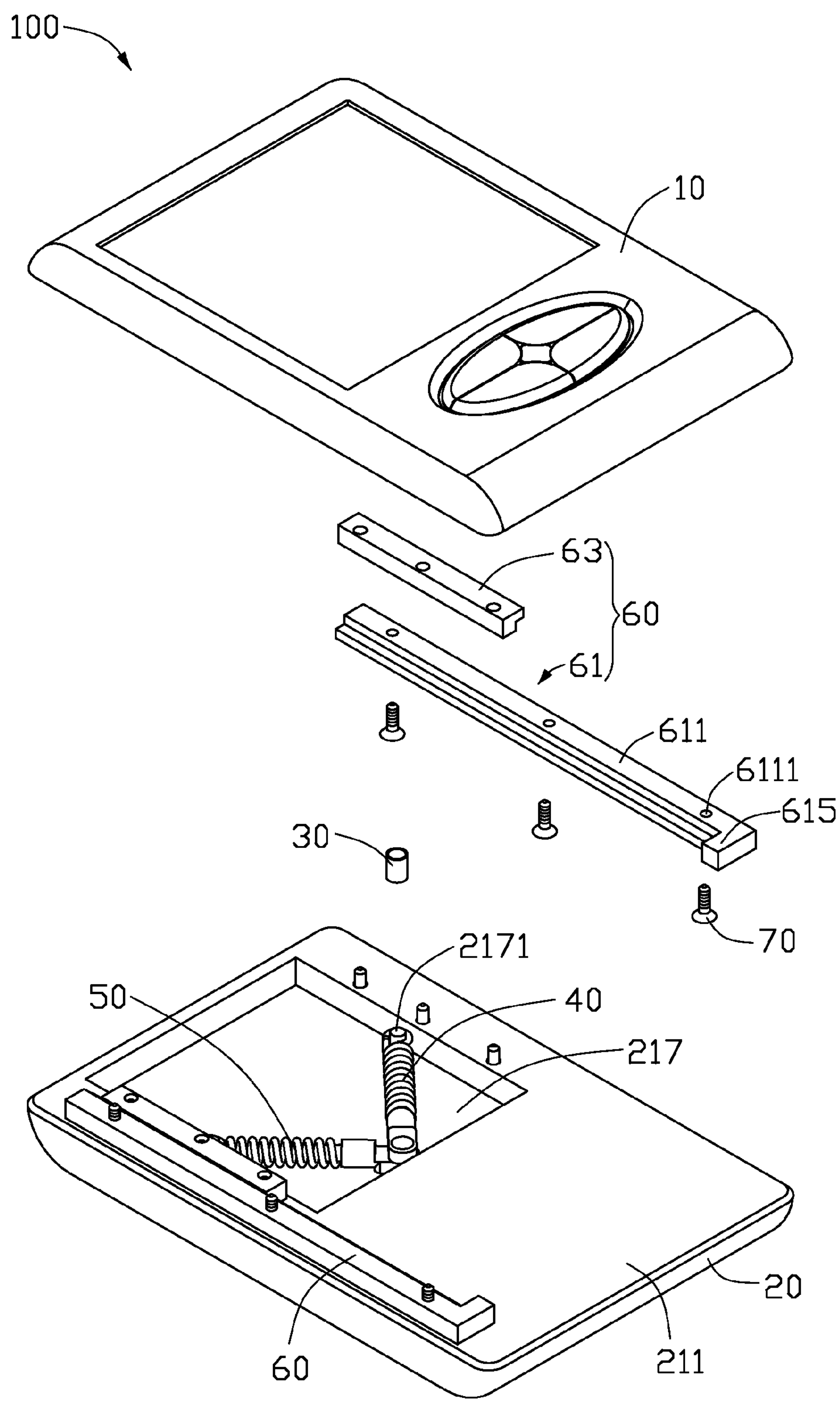
FIG. 1 is an exploded, isometric view of an embodiment of a slide-type portable electronic device, the slide-type portable electronic device including a first body, a second body, a first elastic assembly, a second elastic assembly, and two sliding assemblies.

Referring to FIG. 1, an embodiment of a slide-type portable electronic device 100 includes a first body 10, a second body 20, a sleeve 30, a first elastic assembly 40, a second elastic assembly 50, two sliding assemblies 60, and a plurality of fasteners 70. In the illustrated embodiment, the slide-type portable electronic device 100 is a slide-type mobile phone.

Figure 2:
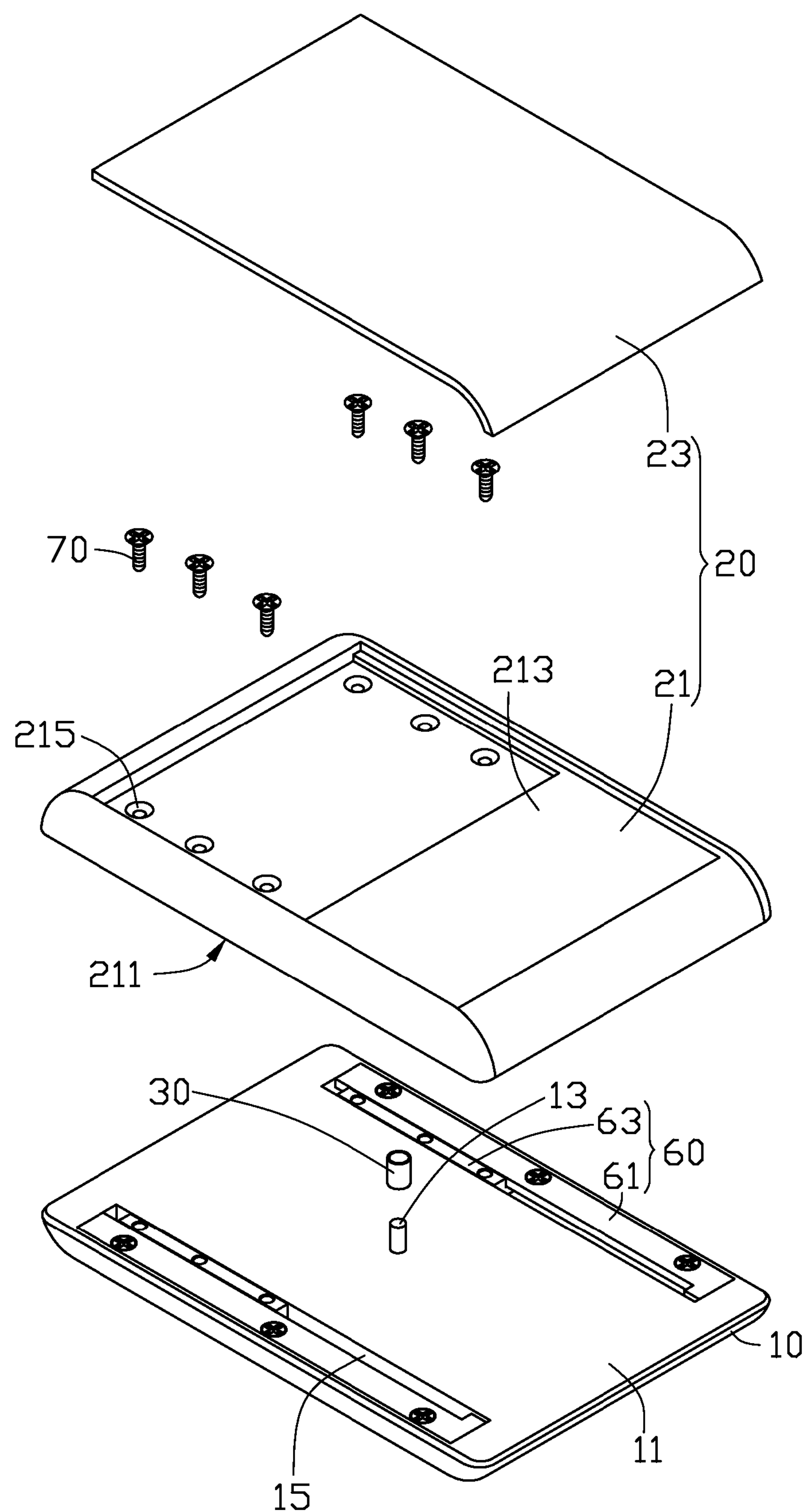
FIG. 2 is similar to FIG. 1, but viewed from another aspect, with the sliding assemblies received in the second body.
Figure 3:
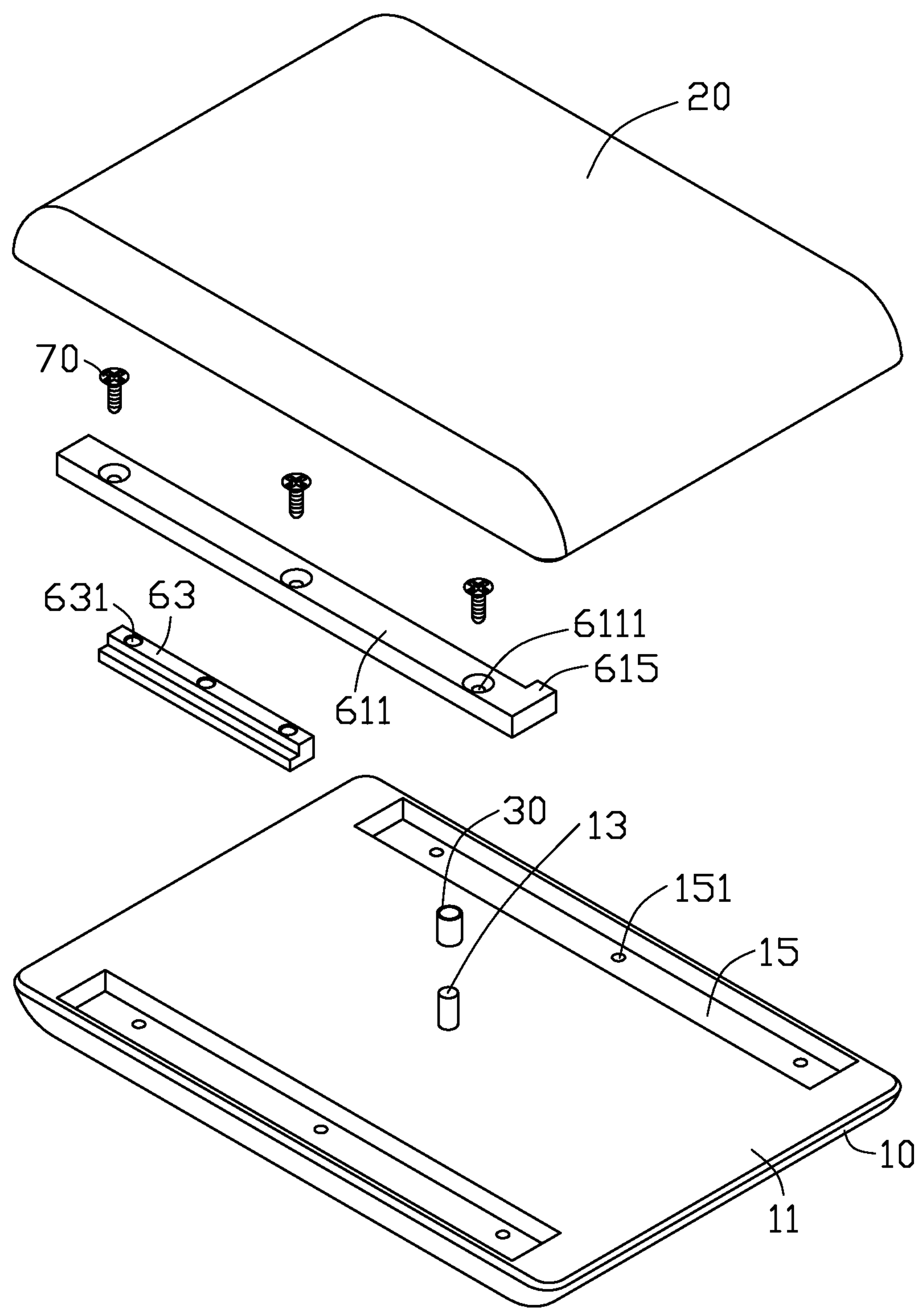
FIG. 3 is similar to FIG. 1, but viewed from another aspect.

Referring to FIGS. 1 through 3, the first body 10 has a first connecting surface 11. A connecting pole 13 is formed on a center of the first connecting surface 11. The first body 10 defines two assembling grooves 15 on opposite sides of the connecting pole 13 in the first connecting surface 11. The first body 10 further defines a plurality of threaded holes 151 in a bottom wall of the assembling groove 15.

Figure 4:
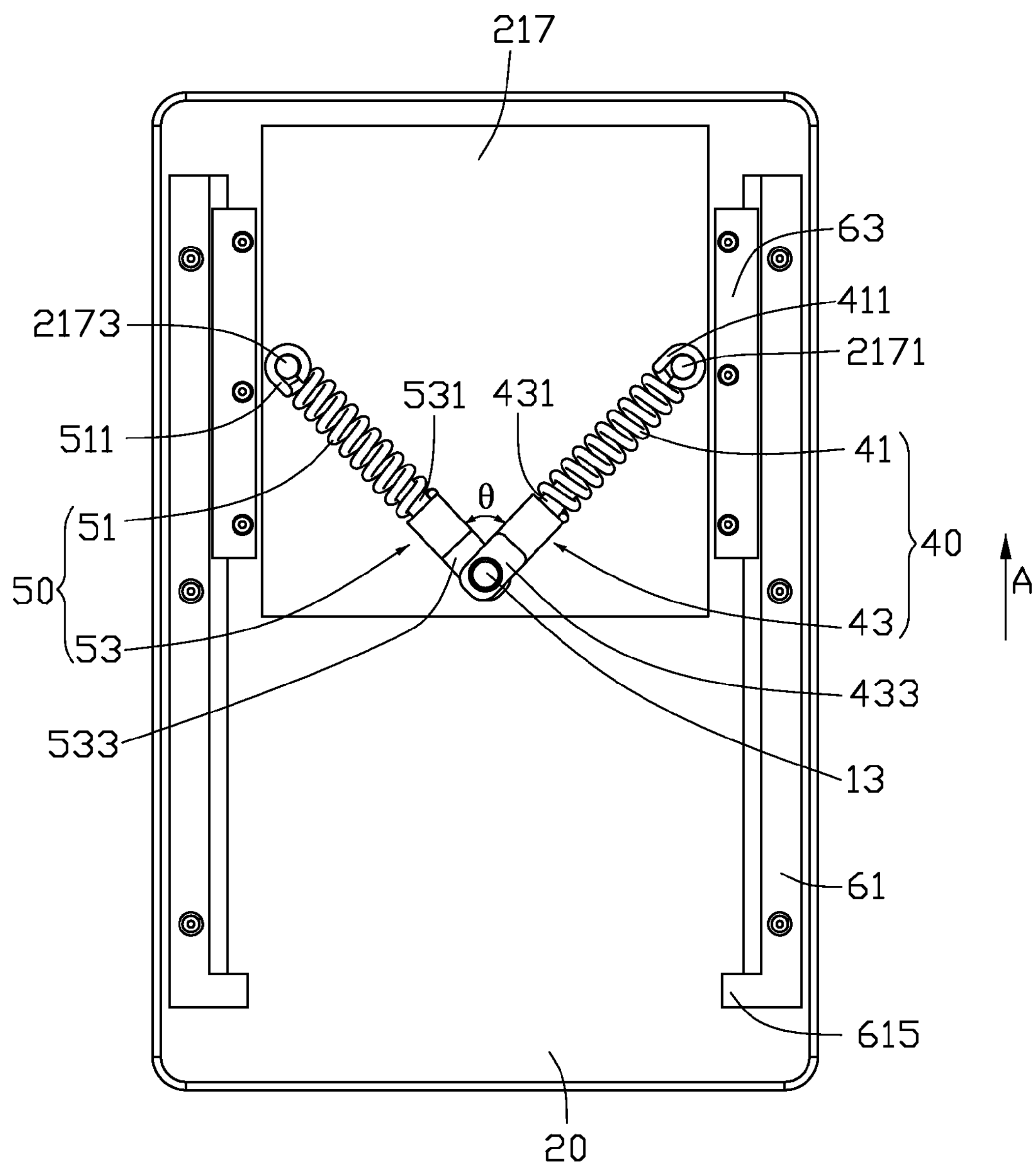
FIG. 4 is a top plan view of the slide-type portable electronic device of FIG. 1 without the first body, showing the slide-type portable electronic device in a closed state.

The second body 20 includes a main portion 21 and a cover 23 coupled to the main portion 21. The main portion 21 includes a first surface 211 and a second surface 213 opposite to the first surface 211. The second body 20 defines a receiving groove 217 in the first surface 211. A first fixing portion 2171 and a second fixing portion 2173 (as shown in FIG. 4) are formed in the receiving groove 217 of the main portion 21. The main portion 21 further defines a plurality of threaded holes 215 in the second surface 213.

Referring also to FIG. 4, the first elastic assembly 40 includes a first elastic member 41 and a first guiding member 43. The first elastic member 41 includes a first connecting hook 411. The first guiding member 43 includes a first guiding pole 431 and a first connecting portion 433 formed on an end of the first guiding pole 431. The first connecting portion 433 defines a through hole (not labeled). The first elastic member 41 is sleeved on the first guiding pole 431.

The second elastic assembly 50 includes a second elastic member 51 and a second guiding member 53. The second elastic member 51 includes a second connecting hook 511. The second guiding member 53 includes a second guiding pole 531 and a second connecting portion 533 formed on an end of the second guiding pole 531. The second connecting portion 533 defines a through hole (not shown). The second elastic member 51 is sleeve on the second guiding pole 531. In the illustrated embodiment, both the first elastic member 41 and the second elastic member 51 are compression springs.

Each sliding assembly 60 includes a slide rail 61 and guide rail 63. The slide rail 61 includes a guiding portion 611 and a resisting portion 615 formed on an end of the guiding portion 611. The guiding portion 611 defines a plurality of first connecting holes 6111. The guide rail 63 defines a plurality of second connecting holes 631.

Referring to FIGS. 1 through 4, during assembly of the slide-type portable electronic device 100, the sliding assemblies 60 are received in the assembling grooves 15. The guide rail 63 slidably engages with the slide rail 61, and the slide rail 61 is fixed to the first body 10 via the fasteners 70. The first elastic assembly 40 is received in the receiving groove 217 with the connecting hook 411 engaging the first fixing portion 2171. The second elastic assembly 50 is received in the receiving groove 217 with the connecting hook 511 engaging the second fixing portion 2173. The sleeve 30 extends through the through hole of the first guiding member 43, and the through hole of the second guiding member 53. The main portion 21 is positioned on the first body 10, and the connecting pole 13 is engaged in the sleeve 30. The main portion 21 is fixed to the guide rails 63 via the fasteners 70, thereby coupling the cover 23 to the main portion 21.

Referring to FIG. 2 and FIG. 4, when the first body 10 is in a closed position relative to the second body 20, the guide rail 63 is positioned at an end of the slide rail 61 away from the resisting portion 615. An angle θ formed by the first elastic assembly 40 and the second elastic assembly 50 is less than 180°. The first elastic member 41 and the second elastic member 51 are slightly compressed, thus providing a small elastic force to maintain the first body 10 in the closed position.

Figure 5:
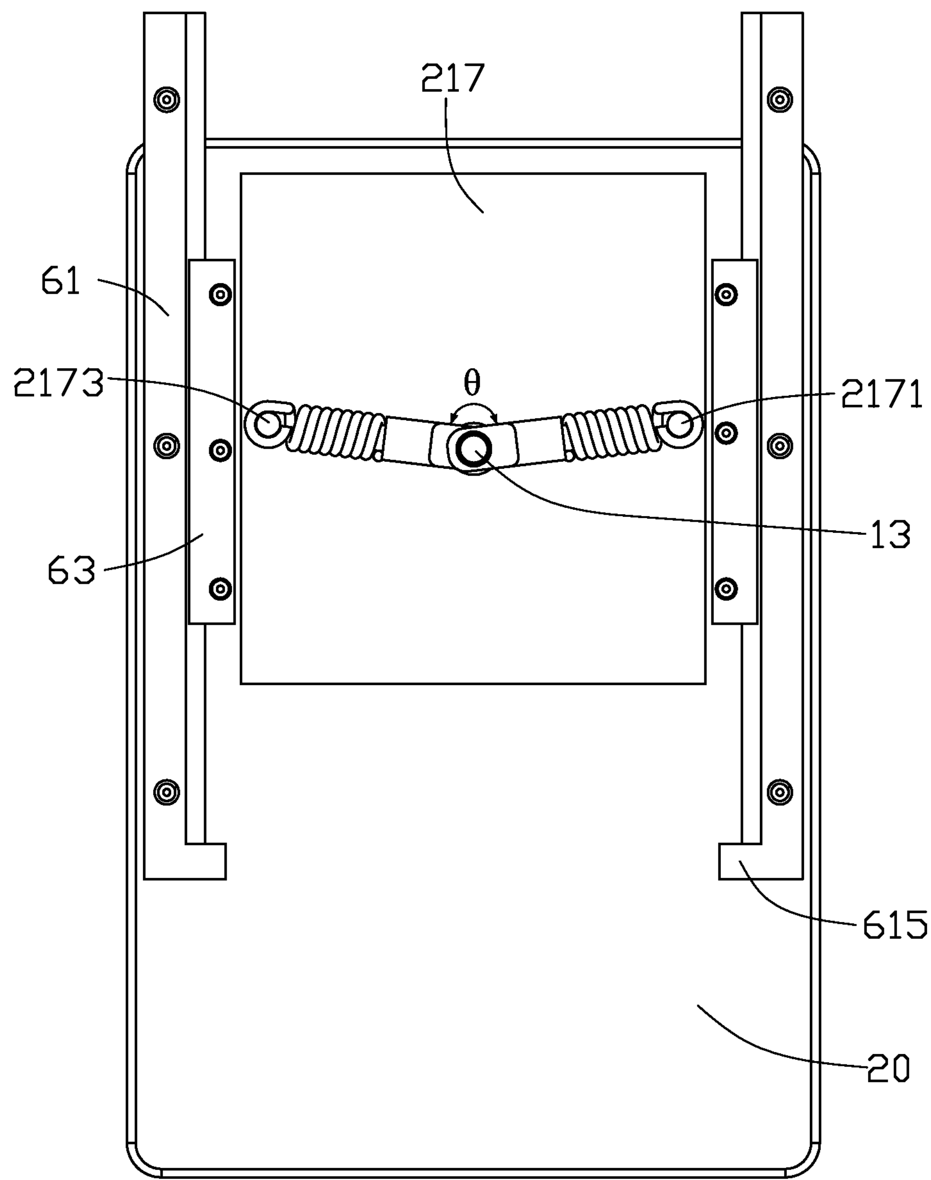
FIG. 5 is similar to FIG. 4, but shows the slide-type portable electronic device in a half-open state.
Figure 6:
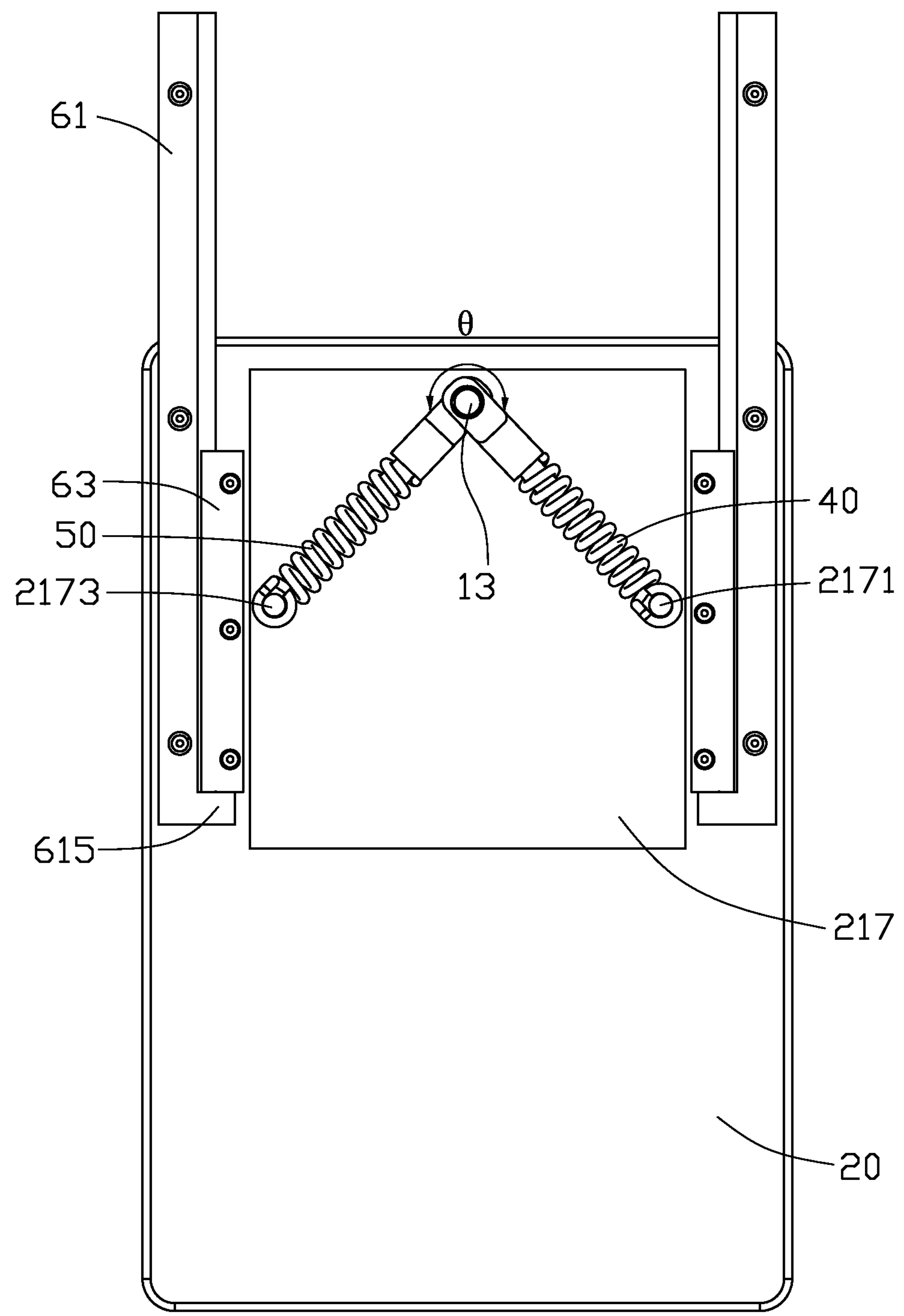
FIG. 6 is similar to FIG. 5, but shows the slide-type portable electronic device in an open state.

Referring to FIG. 4 through 6, during opening of the slide-type portable electronic device 100, the first body 10 slides on the second body 20. The slide rail 61 slides relative to the guide rail 63 along a direction of the arrow A shown in FIG. 4. The connecting pole 13 moves along the direction of the arrow A, so that the first guiding member 43 rotates relative to the first fixing portion 2171, and the second guiding member 53 rotates relative to the second fixing portion 2173. Thus, the first elastic member 41 and the second elastic member 51 are compressed and store potential elastic energy.

When the connecting pole 13 reaches a half-open position shown in FIG. 5, the guide rail 63 is at a middle portion of the slide rail 61, and the first elastic assembly 40 is substantially aligned with the second elastic assembly 50 in a straight line. Both the first elastic member 41 and the second elastic member 51 are fully compressed in the receiving groove 217, thereby storing a maximum elastic energy. Immediately after the connecting pole 13 passes the half-open position, the connecting pole 13 automatically slides under the elastic force of the first elastic member 41 and the second elastic member 51. That is, the first body 10 automatically slides on the second body 20 driven by the first elastic member 41 and the second elastic member 51. When the guide rail 63 resists the resisting portion 615 of the slide rail 61 (as shown in FIG. 6), the connecting pole 13 stops moving, and the slide-type portable electronic device 10 is in an open state. The angle θ exceeds 180°.

If the first elastic member 41 and the second elastic member 51 are broken, the first body 10 can be disassembled from the second body 20, and the first elastic member 41 or the second elastic member 51 can be replaced with another elastic member. Thus, the first elastic member 41 and the second elastic member 51 are easily replaceable, and the slide-type portable electronic device 100 has a low maintenance cost. Moreover, the first body 10 slides smoothly on the second body 20, because the guide rails 63 and the slide rail 61 are positioned between the first body 10 and the second body 20.

It should be pointed out that the slide-type portable electronic device 100 may include a single elastic assembly providing the elastic force to urge the first body 10 to slide relative to the second body 20. The slide-type portable electronic device 100 may include a single sliding assembly 60 slidably connecting the first body 10 to the second body 20. Furthermore, the slide-type portable electronic device 100 does not need to include the sleeve 30, because the connecting pole 13 can be directly inserted into the through holes of the first guiding member 43 and the second guiding member 53.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A slide-type portable electronic device, comprising:

a first body;

a second body;

two sliding assemblies slidably connecting the first body to the second body;

a first elastic assembly comprising a first guiding member and a first compression spring connecting with the first guiding member; and a second elastic assembly comprising a second guiding member and a second compression spring connecting with the second guiding member;

wherein a first fixing portion and a second fixing portion are formed on opposite sides of the second body, a connecting pole is formed on the first body; the first compression spring is connected to the first fixing portion, the second compression spring is connected to the second fixing portion; one end portion of the first guiding member and one end portion of the second fixing portion are rotatably sleeved on the connecting pole, and the first guiding member and the second guiding member thereby cooperatively forming an adjustable angle; and the first compression spring is partially sleeved on the first guiding member and capable of being deformed along a longitudinal direction of the first guiding member, the second compression spring is partially sleeved on the second guiding member and capable of being deformed along a longitudinal direction of the second guiding member.

2. The slide-type portable electronic device of claim 1, wherein the second body defines a receiving groove for receiving the first elastic assembly and the second elastic assembly.

3. The slide-type portable electronic device of claim 1, wherein the second guiding member comprises a second connecting portion; and the connecting pole engages with the second connecting portion.

4. The slide-type portable electronic device of claim 3, wherein the second guiding member further comprises a second guiding pole formed on an end of the second connecting portion; the second compression spring is sleeved on the second guiding pole.

5. The portable electronic device of claim 1, wherein the second compression spring comprises a second connecting hook; the second connecting hook engages with the second fixing portion.

6. The slide-type portable electronic device of claim 1, further comprising a sleeve sleeved on the connecting pole.

7. The slide-type portable electronic device of claim 1, wherein the at least one sliding assemblies comprises a guide rail and a slide rail slidably connected to the guide rail; the slide rail is fixed to the first body, and the guide rail is fixed to the second body.

8. The slide-type portable electronic device of claim 7, wherein the first body defines an assembling groove for receiving the guide rail and the side rail.

9. The slide-type portable electronic device of claim 1, wherein the second body comprises a main portion and a cover engaging the main portion.

* * * * *